(12) United States Patent
Buzbee et al.

(10) Patent No.: US 6,330,691 B1
(45) Date of Patent: Dec. 11, 2001

(54) USE OF DYNAMIC TRANSLATION TO PROVIDE BREAKPOINTS IN NON-WRITEABLE OBJECT CODE

(75) Inventors: William B. Buzbee, Half Moon Bay; Carl D. Burch, Mountain View, both of CA (US)

(73) Assignee: Institute for the Development of Emerging Architectures LLC, Cupertino, CA (US)

( * ) Notice: Subject to any disclaimer, the term of this patent is extended or adjusted under 35 U.S.C. 154(b) by 878 days.

(21) Appl. No.: 08/606,113

(22) Filed: Feb. 23, 1996

(51) Int. Cl.⁷ ........................................ H02H 3/05
(52) U.S. Cl. ............................... 714/35; 714/38
(58) Field of Search ................ 714/35, 38–39, 714/46, 37; 717/4

(56) References Cited

U.S. PATENT DOCUMENTS

| | | | |
|---|---|---|---|
| 5,432,795 | * | 7/1995 | Robinson .................. 395/183.14 |
| 5,442,766 | * | 8/1995 | Chu et al. ...................... 395/414 |
| 5,507,030 | * | 4/1996 | Sites ............................... 395/800 |
| 5,583,988 | * | 12/1996 | Crank et al. .................. 3995/185.01 |

OTHER PUBLICATIONS

"PA–RISC 1.1 Architecture and Instruction Set Manual", Hewlett Packard, HP Part No. 09740–09939, Feb. 1994, p. 5–138.

R. Cmelik, D. Keppel "Shade: A Fast Instruction–Set Simulator for Execution Profiling", 1994 ACM Sigmetrics Conference, 1994.

R. Cmelik, D. Keppel "Shade: A Fast Instruction–Set Simulator for Execution Profiling", Technical Report UWCSE 93–06–06, 1993.

T. Halfhill, "Emulation: RISC's Secret Weapon" BYTE Apr. 1994, pp. 119, 120, 122, 124, 126, 128, 130.

* cited by examiner

*Primary Examiner*—Dieu Minh Le

(57) ABSTRACT

Dynamic translation is used during debugging of a computer application process. The computer application process resides in a computing system in which blocks of code within a shared library are utilized by the computer application process. The blocks of code within the shared library are also available to be utilized by other applications in the system. During runtime, the computer application process is dynamically translated to produce translated code. The dynamic translation includes translation of a first block of code within the shared library to produce a translated block of code. The translated block of code is included within the translated code. Debugging code, such as a break instruction, may then be added to the translated code. Alternatively, only blocks of code within the shared library which are called by the computer application process or modified by a debugger are dynamically translated. In this alternative case, the object code for the computer application process is executed without being dynamically translated.

14 Claims, 12 Drawing Sheets

USE OF DYNAMIC TRANSLATION TO PROVIDE BREAKPOINTS IN NON-WRITEABLE OBJECT CODE

BACKGROUND

The present invention concerns debugging programs and pertains particularly to the use of dynamic translation to provide breakpoints in non-writeable object code such as procedures within a shared library.

Programs are generally written in a high level programming language. This high level language, often referred to as source code, is translated by a compiler program into an assembly language. The binary form of the assembly language, called object code, is the form of the code actually executed by a computer. The object code is generally first produced in object code modules which are linked together by a linker For the purpose of the present application, the term "compile" includes both the process of producing the object code modules and linking the object code modules together.

Code debuggers are programs which aid a programmer in finding errors in code. They are extremely useful tools for improving the efficiency of the code debugging process. One of the important features of a code debugger is to allow a programmer to stop the execution of code and to check the values in each user resource the code is operating upon. A user resource is typically a variable defined in the source code. The values in the user resources give clues to indicate the source of trouble when a program is not operating correctly.

In order for a debugger to set a breakpoint at a particular address in an application, if the application is currently running, the application must be stopped. On computing systems which are operating under the UNIX operating system, this is typically done by sending the application a signal. Once the application is stopped, the debugger replaces the object code currently residing at the particular address with a special instruction which will cause execution to halt when it is reached. For example, for computing systems which are designed to execute a Precision Architecture Reduced Instruction Set Computer (PA-RISC) instruction set, a break instruction would typically be used to cause execution to halt. See "PA-RISC 1.1 Architecture and Instruction Set Reference Manual", Third Edition, Hewlett-Packard Company Part Number 09740–90039, p. 5–138.

After the break instruction is placed in the object code, the application is allowed to resume execution. When and if execution of the application reaches the particular address, the break instruction is encountered and execution of the application is halted. Control is then given to the debugger. To remove the breakpoint at the particular address, the debugger replaces the break instruction with the instruction that was originally at the particular address.

The above described scheme for introducing break instructions into application programs has been complicated by recent developments in the architecture of application programs. Specifically, application programs are now often built out of layers of shared and reusable code which perform common tasks. For example, display window management code, database code and statistical analysis code typically reside in procedures which are shared by many applications. The procedures are typically packaged in units called shared libraries (SL) or demand-loaded libraries (DLL). Procedures within a shared library are typically shared by many application programs.

The use of shared libraries introduces a problem for a debugging program. Specifically, use of shared libraries makes it difficult to set break points in an application program. If a debugger replaces an instruction in a shared library with a special break instruction, then any of the applications which are currently using the shared library could erroneously hit the break point and halt operation.

To solve this problem, debuggers typically cause the operating system to make a special copy of all shared libraries used by the application being debugged. Other applications are prevented from accessing the copy of the shared libraries. However, this can be a complex and expensive method for allowing debugging. This requires the operating system to make a copy of all of the shared code whether it will actually be executed or not. This can lead to quite extensive copying as it means that the operating system must copy all the shared code which could possibly be used by the application and any additional shared code which the copied shared code could utilize, and so on.

In addition, when shared code management employs methods in which the shared code is not made visible to the application until and if it is needed (i.e., load on demand), the task is significantly compounded in difficulty for the debugger. For example, when deferred binding is utilized, this delays the linkage of shared code until just before it is used at run-time. See, for example, Programming on HP-UX, HP 9000 Series 700/800 Computers, available as HP Part No. B2355–90652, from Hewlett-Packard Company, having a business address of 3000 Hanover Street, Palo Alto, Calif. 94304, January 1995, p 5–14.

This means that the need for shared code (and a special copy thereof) may not be evident before runtime. This makes it extremely difficult to determine which shared code could possibly be used by an application in time to make a copy of the shared code for use by the debugger.

SUMMARY OF THE INVENTION

In accordance with the preferred embodiment of the present invention, dynamic translation is used during debugging of a first application. The first application resides in a computing system in which blocks of code within a shared library are utilized by the first application. The blocks of code within the shared library are also available to be utilized by other applications in the system. During runtime, the first application is dynamically translated to produce translated code. The dynamic translation includes translation of a first block of code used within the shared library to produce a translated block of code. The translated block of code is included within the translated code. Debugging code, such as a break instruction, may then be added to the translated code.

In an alternative embodiment of the present invention only blocks of code within the shared library which are called by the first application or modified by the debugger are dynamically translated. The object code for the first application is executed without being dynamically translated.

A block of code is a grouping of one or more instructions. The block of code may thus consist of a single instruction, a straight-line run of instructions terminated by a branch (similar to a "basic block" as used by a compiler), an entire procedure, or some other grouping of instructions. In the preferred embodiments of the present invention, the block of code is the unit of translation utilized by a dynamic translator. This unit of translation may be, for example, a procedure, a basic block, a page, a cache line, an instruction, or some other grouping of instructions.

There are several significant advantages of the present invention over the prior art. For example, the dynamic translator only creates a translation for code which is to be executed. A large percentage of virtually all existing code is usually not executed because it exists to handle unusual and/or exceptional cases. As opposed to prior art methods where the operating system must copy all of the shared code which could possibly be called by an application, the present invention requires only that shared code actually accessed by the application at runtime or by the debugger is actually translated.

DESCRIPTION OF THE PREFERRED EMBODIMENT

Figure 1:
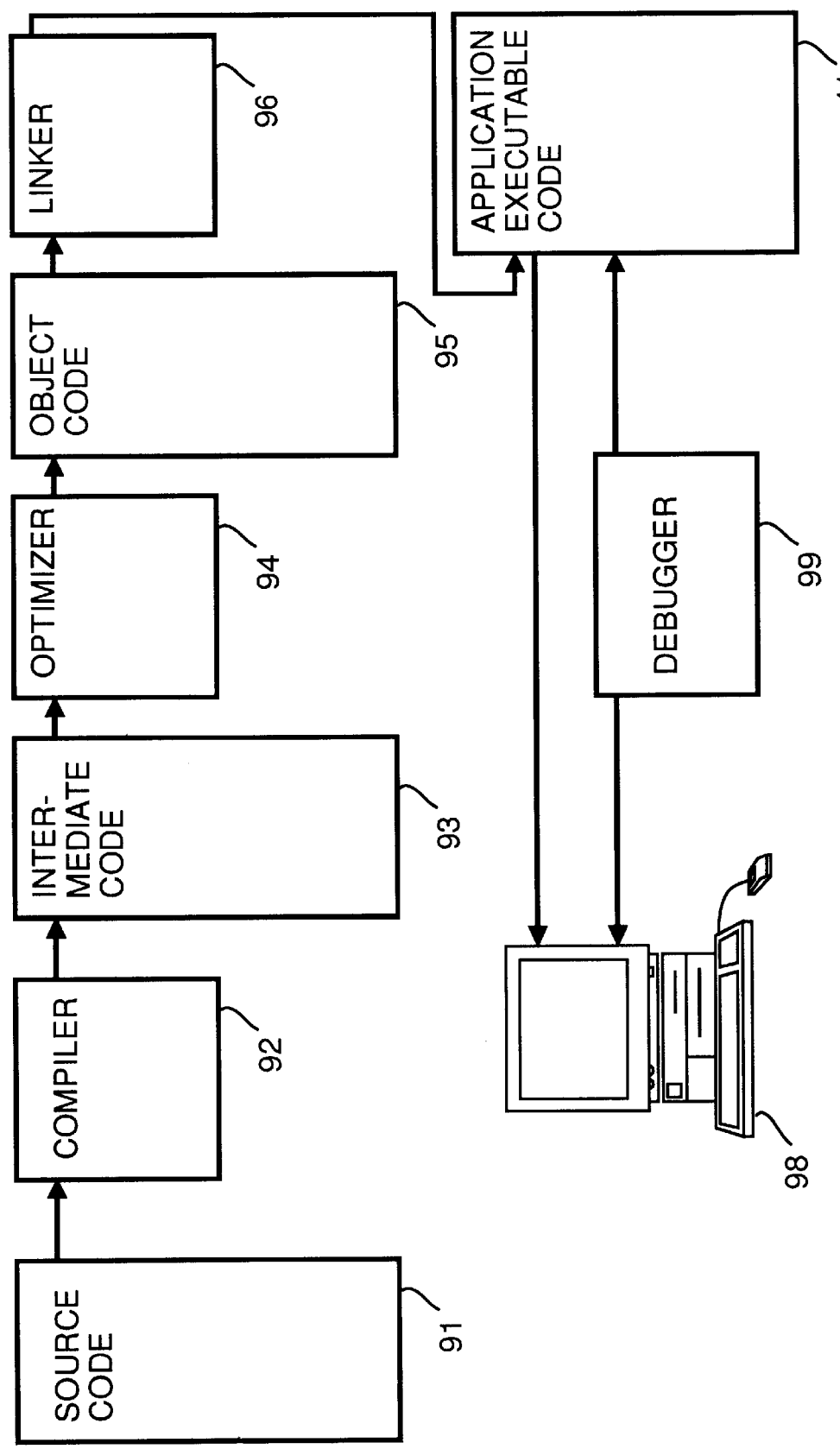
FIG. 1 shows a block diagram of a computing system which utilizes a compiler to produce executable code which runs concurrently with a debugger in accordance with the prior art.

FIG. 1 shows a block diagram of a computer system which uses a compiler system to produce executable code for an application. A compiler 92 receives source code 91 and produces intermediate code 93. The intermediate code is a list of object (assembly) language instructions. An optimizer 94 receives the intermediate code 93 and produces optimized object code 95. A linker 96 receives optimized object code 95 and produces application executable code 41 (also called application 41). Application executable code 41 may then be executed by a computing system 98. A debugger 99 running concurrently with application executable code 41 is used to debug application executable code 41.

Figure 2:
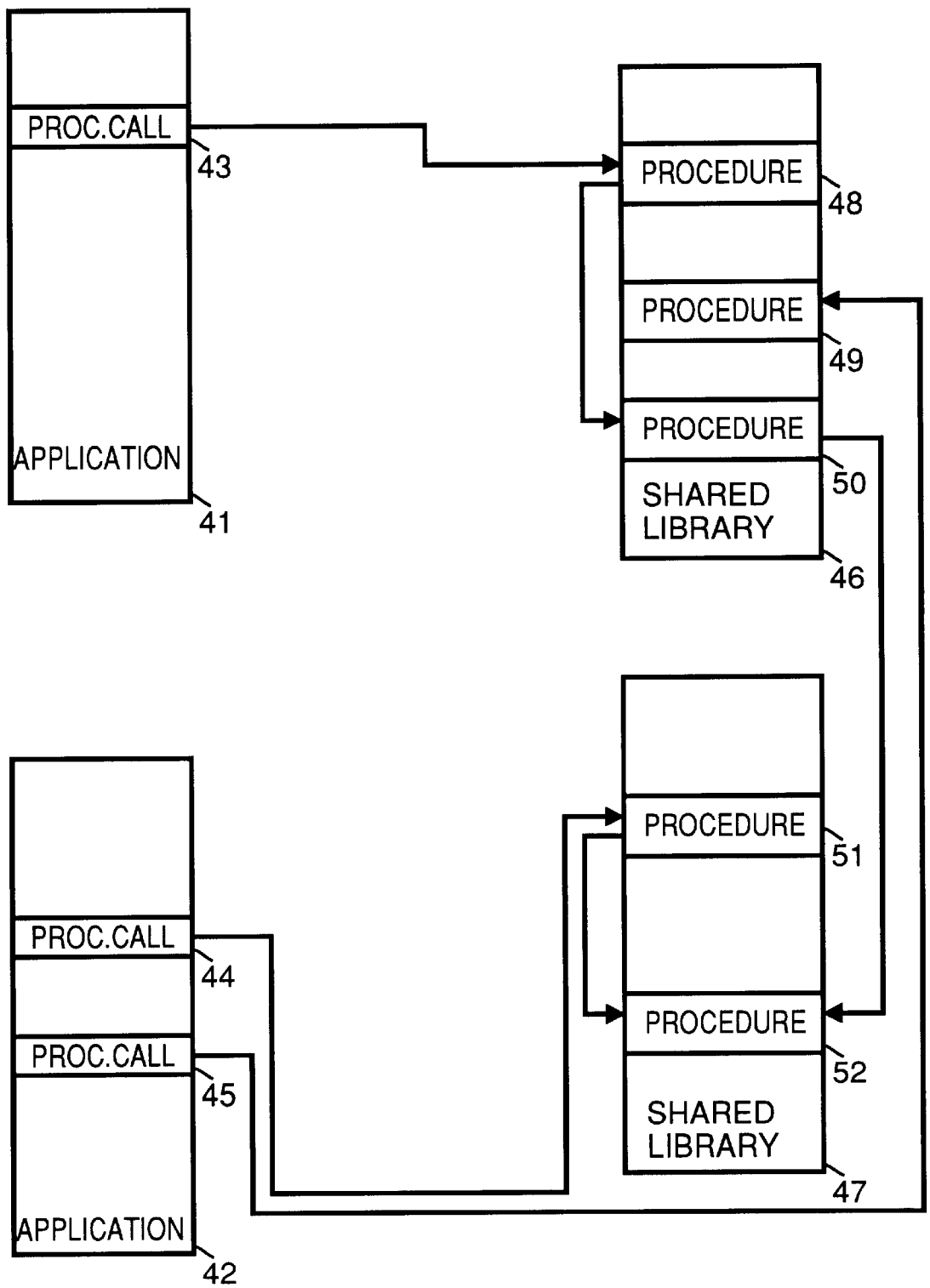
FIG. 2 shows two applications which access shared libraries in accordance with the prior art.

FIG. 2 illustrates how various applications running on a computing system utilize shared libraries during execution. Within executable code for an application 41, a procedure call 43 points to a procedure 48 within a shared library 46. As shown in FIG. 2, procedures within a shared library may make calls to other procedures within shared libraries. For example, procedure 48 makes a call to a procedure 50 within shared library 46. Likewise, procedure 50 makes a call to a procedure 52 within shared library 47.

Shared library 46 and shared library 47 are utilized by other applications. This is illustrated in FIG. 2 by application 42 including a procedure call 44 which points to a procedure 51 within shared library 47. Procedure 51 makes a call to procedure 52 within shared library 47. Also, application 42 includes a procedure call 45 which points to a procedure 49 within shared library 46.

When a debugger is used to debug application 41, the debugger causes the computer operating system to make a special copy of all shared libraries used by the application being debugged. This is illustrated by FIG. 3.

Figure 3:
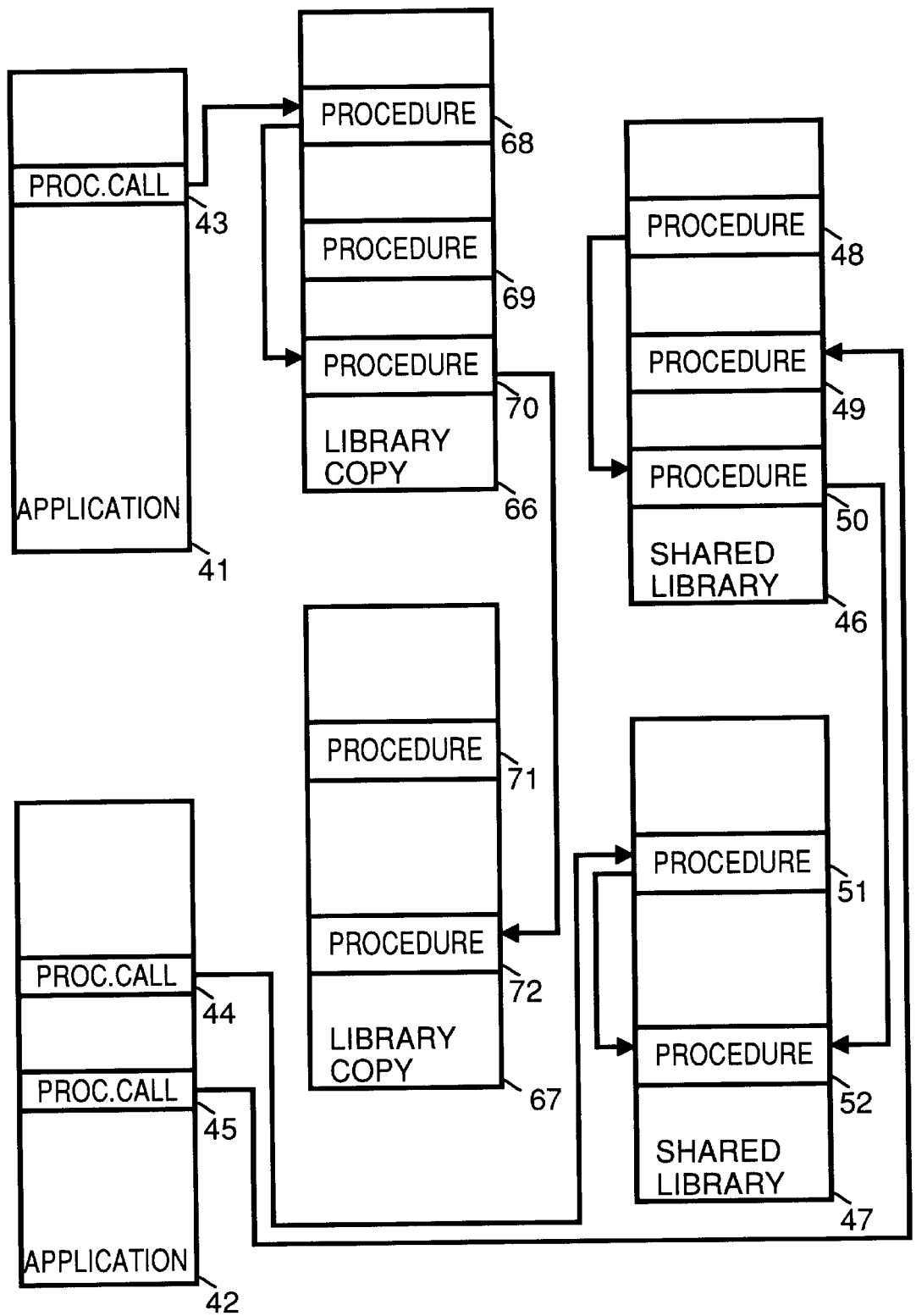
FIG. 3 shows copies of shared libraries shown in FIG. 4 copied in order to allow a debugger to insert break points in accordance with the prior art.

In FIG. 3, there is shown a library copy 66 which is a copy of shared library 46. Library copy 66 includes procedure 68, procedure 69 and procedure 70. Procedure 68, procedure 69 and procedure 70 are respectively copies of procedure 48, procedure 49 and procedure 50. Also shown is a library copy 67 which is a copy of shared library 44. Library copy 67 includes procedure 71 and procedure 72. Procedure 71 and procedure 72 are respectively copies of procedure 51 and procedure 52.

As is illustrated by FIG. 3, when application 41 is being debugged, procedure call 43 is modified to point to procedure 68 within library copy 66. Break points may thus be placed in application 41, library copy 66 and library copy 67 without the risk of having another application erroneously hitting a break point and halting operation. Application 42 continues to make procedure calls into shared library 46 and shared library 47. Application 42 is not allowed access into library copy 66 or library copy 67. However, as discussed above, this can be a complex and expensive method for allowing debugging. In addition, when shared code management employs a load on demand method it becomes difficult even to determine which shared libraries need to be copied.

Figure 4:
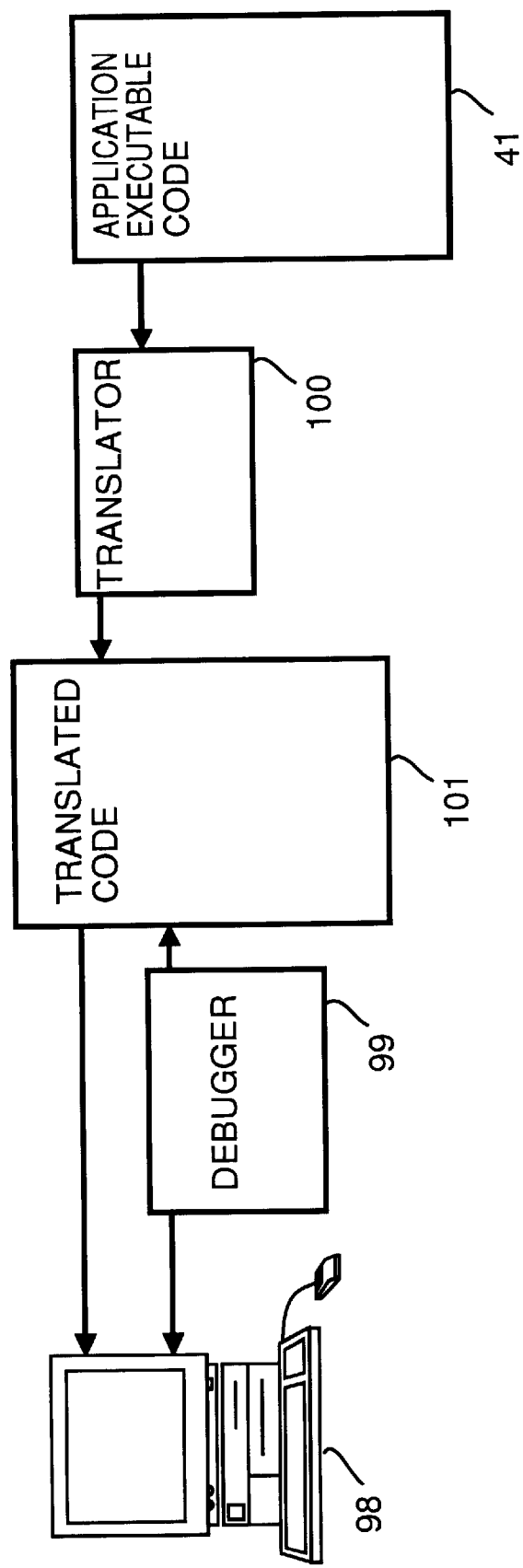
FIG. 4 shows a block diagram of a computing system in which dynamically translated executable code which runs concurrently with a debugger in accordance with the preferred embodiment of the present invention.

FIG. 4 illustrates use of dynamically translated executable code during debugging in order to simplify the debugging process when shared libraries are utilized. Rather than directly running application executable code 41, a dynamic translator 100 is used to produce translated code during runtime. Blocks of code from application executable code 41 are translated at execution time. The translated blocks of code are then stored in memory as translated code 101. Translated code 101 is stored in memory so that each block of code which is executed a number of times need be translated only once during runtime. This approach allows the flexibility of not requiring that code be translated before runtime, but reduces the overhead that would result if a block of code were translated every time it was executed.

Translated code 101 includes both executable code originally within application executable code 41 as well as procedures within shared library 46 and shared library 47 which are utilized by application 41. The procedures within shared library 46 and shared library 47 are translated and added to translated code 101 only as they are actually utilized in runtime or accessed by a debugger 99. Debugger 99 inserts break points within translated code 101 and not within executable code 41, shared library 46 or shared library 47. This is illustrated by FIG. 5.

Figure 5:
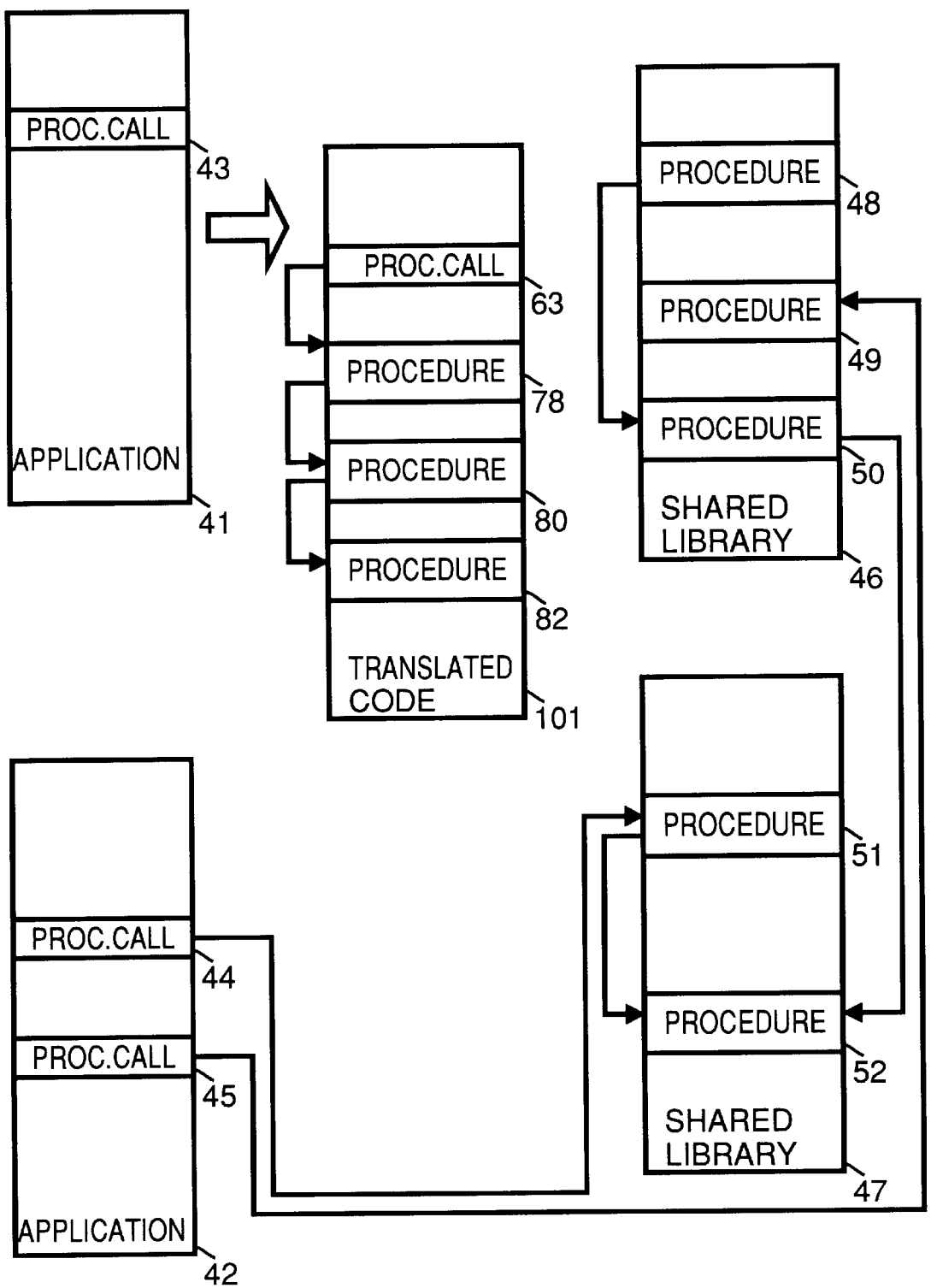
FIG. 5 illustrates use of dynamic translation in order to allow a debugger to insert break points in blocks of code stored within a shared library in accordance with the preferred embodiment of the present invention.

In FIG. 5, translated code 101 includes portions of executable code of application 41, and portions of shared libraries 46 and 47 which are translated during runtime of application 41 as they are needed. Thus, procedure call 43 is translated to a procedure call 63 within translated code 101. Likewise, procedure 48 is translated to procedure 78, procedure 50 is translated to procedure 80, procedure 52 is translated to procedure 82. As shown, procedure 78, procedure 80, and procedure 82 are all within translated code 101. Also within translated code 101, debugger 99 places break point as desired. In order to place break points in locations of the application not yet executed, the pertinent code within application 41 or any shared library is first translated and added to translated code 101. Once translated, debugger 99 places the break points in the desired location within the translated code.

While FIG. 5 shows the entirety of procedures 78, 80 and 82 are translated, this may not necessarily be so in various embodiments of the invention. For example, when dynamic translator uses a unit of translation which is a basic block of code, only basic blocks of a procedure which are actually needed are translated. The remainder of a procedure, if unused, will not be translated.

Figure 6:
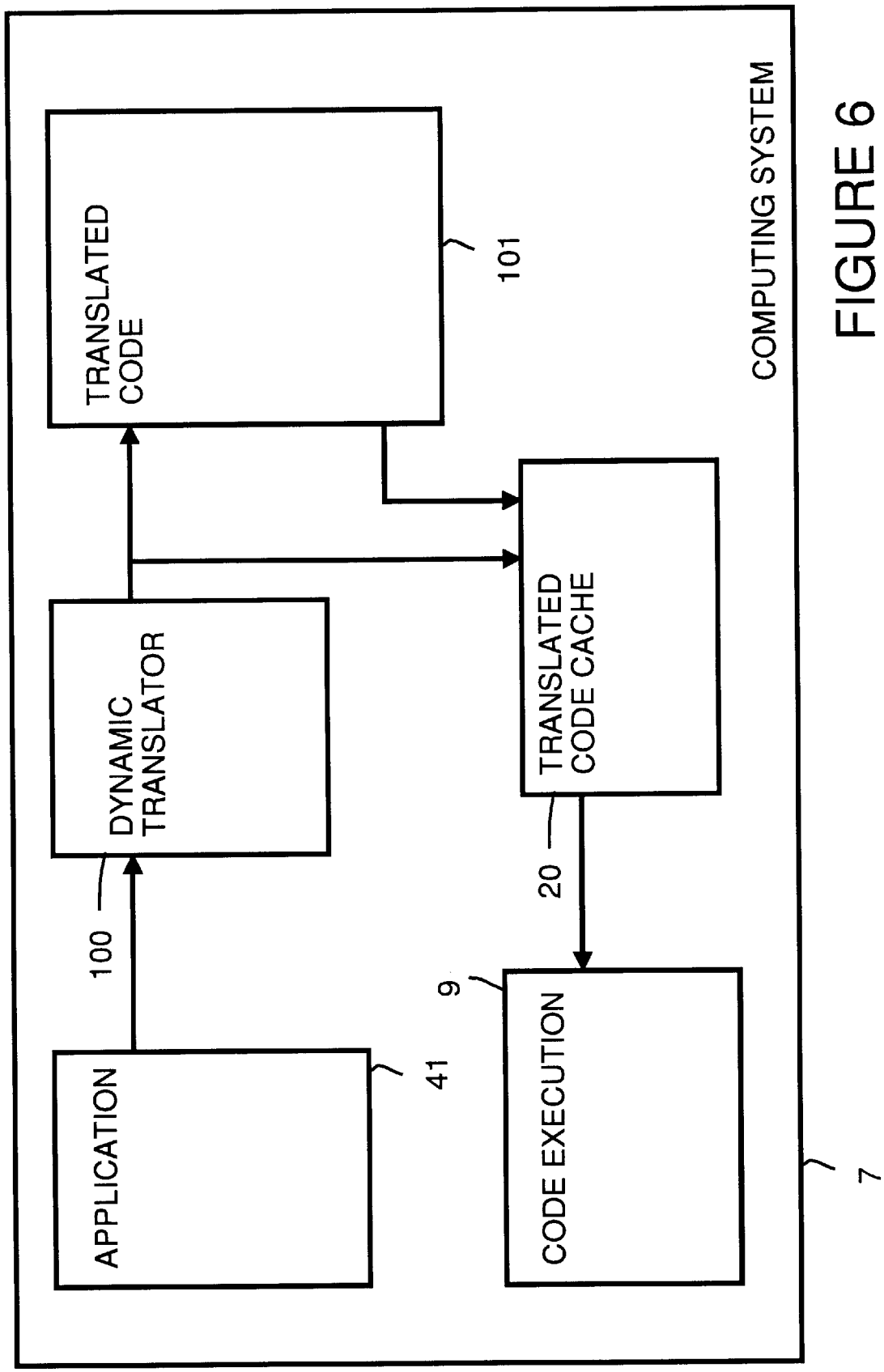
FIG. 6 is a simplified block diagram which shows a computing system which includes a dynamic translator in accordance with the preferred embodiment of the present invention.

FIG. 6 shows a simplified block diagram which shows how a computing system 7 uses dynamic translator 100 to execute application 41. As discussed above, dynamic translator 100 differs from a compiler in that a compiler produces executable code before runtime. Dynamic translator 100 produces translated code 101 during runtime. Blocks of code from application 41 are translated at execution time. The translated blocks of code are shown in FIG. 6 as translated code 101. Translated code 101 is stored in memory (e.g., cache memory) so that each block of code which is executed a number of times need be translated only once during runtime. This approach allows the flexibility of not requiring that code be translated before runtime, but reduces the overhead that would result if a block of code were translated every time it was executed.

In the preferred embodiment, translated code 101 is stored in a translated code cache 20. When translated code cache 20 is full, it may be necessary to discard some previously translated blocks of code in order to make room for newly translated blocks of code. This will require the blocks of code which were discarded to be retranslated if they are used again, but does allow for potential savings in memory usage. Alternately, rather than discarding previously translated blocks of code, they can be stored in system memory.

Figure 7:
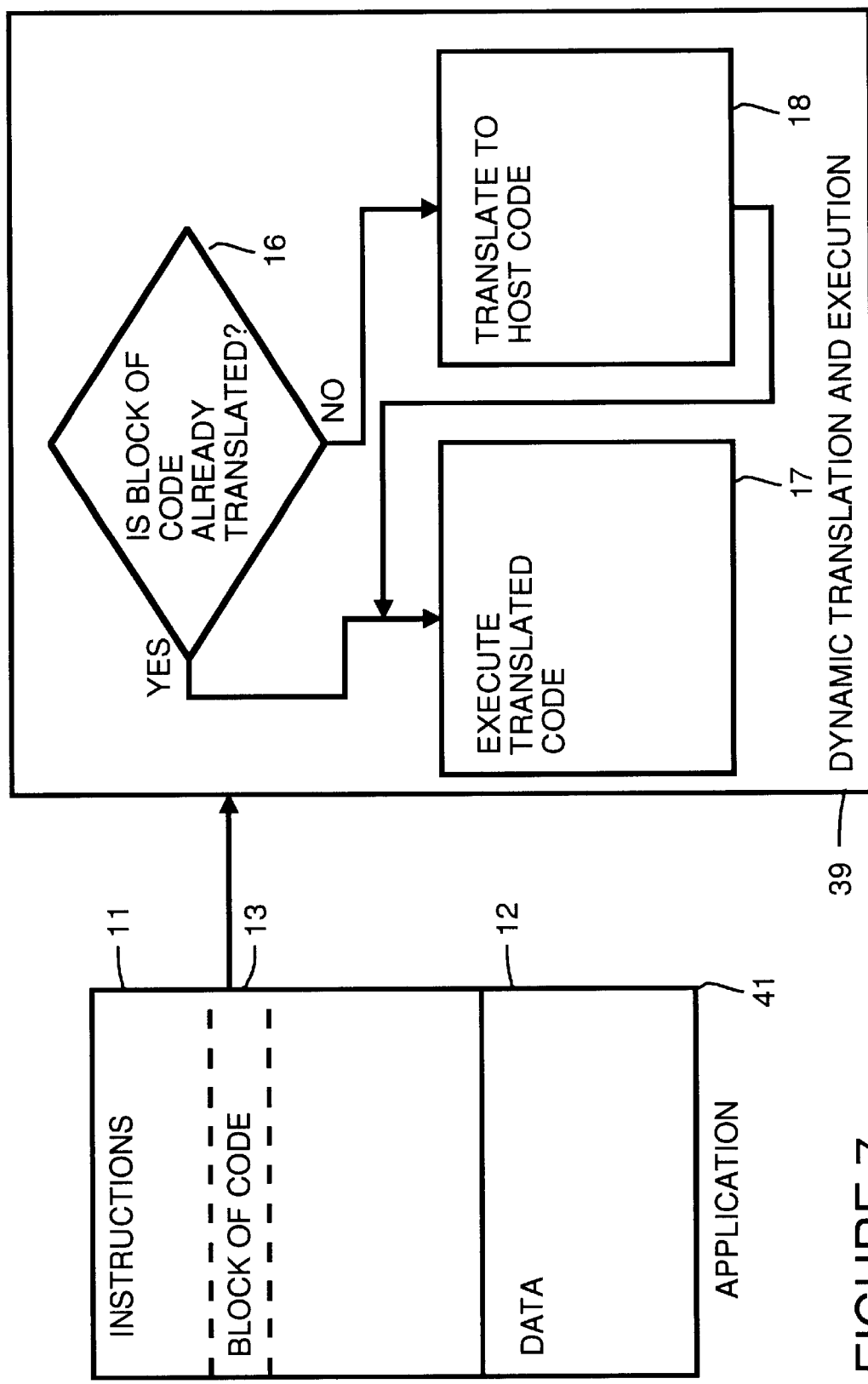
FIG. 7 illustrates use of a dynamic translator to dynamically translate code in accordance with the preferred embodiment of the present invention.

FIG. 7 illustrates use of a dynamic translation and execution process 39 to dynamically translate and execute code application 41. The translation produces translated object code 101. As discussed above, translated code 101 includes translated code blocks from shared libraries called by application 41. Debugger 99 may additionally add debugging information, such as break points, into translated code 101.

Application 41 is shown to include instructions 11 and data 12. As instructions 11 within application 41 are executed, whenever a program counter points to a new block of code 13 within application 41, in a step 16, it is determined whether the new block of code 13 has been encountered before by dynamic translation and execution process 39, or accessed by debugger 99 and thus been previously translated. If not, in a step 18 the block of code is translated to object code which is native to the host computer system. If the new block of code 39 includes a call to a block of code within a shared library, the call is translated. In a step 17, the translated code for block of code 13 is executed.

When the translated call is executed and the shared library is called, blocks of code within the shared library are translated as needed, if the called blocks of code have not already been translated. As discussed above, a block of code may be an entire procedure or only a portion of a procedure. If only a portion of the code within a procedure is used, depending on the unit of translation used by translator 100, only the used portion of the procedure is translated. As discussed above, the block of code to be translated may already be native to the host computer system so that the translation may be merely object code to object code translation which facilitates the introduction of additional debugging code to the translated object code.

Figure 8:
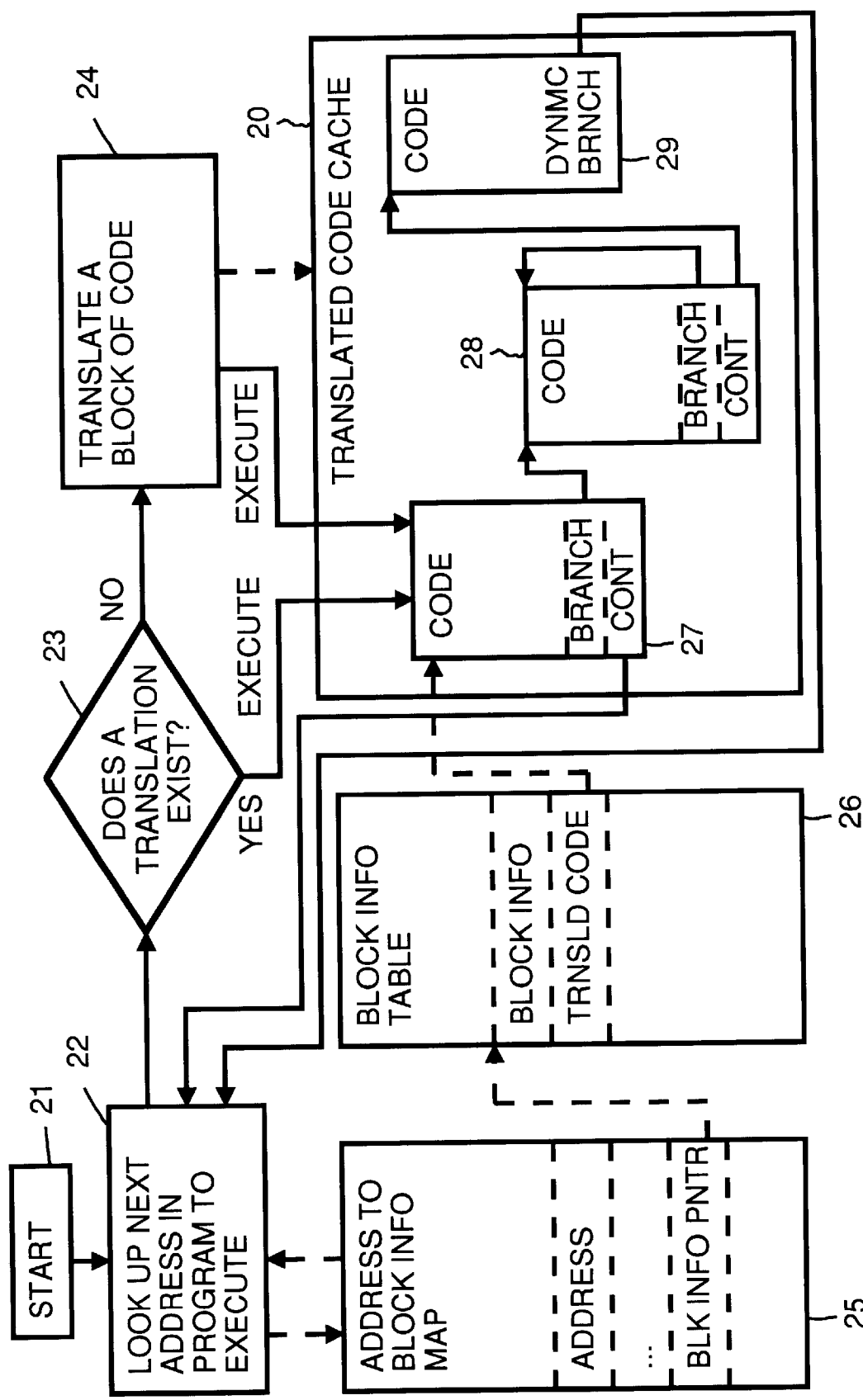
FIG. 8 shows an address to block information map, a block information table, and a translated code cache used by a dynamic translator in accordance with the preferred embodiment of the present invention.

FIG. 8 further illustrates the process of executing an application by dynamic translation and execution process 39. In a step 21, execution of the application is started. In a step 22, a next application address to be executed is looked up. This is done, for example, using an address to block information map 25. Address to block information map 25 includes entries blocks of code in the application and additionally may include entries for blocks of code in a shared library called by the application. In the preferred embodiment, only addresses for blocks of code which are actually needed for execution are included within block information map 25. These addresses are added at run-time as the blocks of code are needed.

A block of code is a grouping of one or more instructions. The block of code may thus consist of a single instruction, a straight-line run of instructions terminated by a branch (similar to a "basic block" as used by a compiler), an entire procedure, or some other grouping of instructions. In the preferred embodiments of the present invention, the block of code is the unit of translation utilized by dynamic translator 100. This unit of translation may be, for example, a procedure, a basic block, a page, a cache line, an instruction, or some other grouping of instructions.

Each entry in address to block information map 25 includes at least a first program address which identifies the starting address of a block of code within the application or a block of code within a shared library. In addition, each entry includes a block information pointer which points to a location in a block information table 26 which includes block information about the block of code from the application or shared library. The block information within block information table 26 will include a pointer to translated code if translated code exists for the block of code.

After looking up a next application address to be executed, in a step 23, a determination is made as to whether translated code exists for the block of code from the application or shared library. This is done, for example, from information retrieved from block information table 26. If a translation does not exist for the block of code, in a step 24, the block of code is translated. The translated code is then executed.

Translated code cache 20 is used to hold translated blocks of code for efficient execution. The number of blocks of code held by translated code cache 20 varies, for example, depending on available memory. In FIG. 8, the blocks of code within translated code cache 20 are represented by a code block 27, a code block 28 and a code block 29. Any of these code blocks may represent a translated procedure from a shared library.

Code blocks within translated code cache 20 may branch to other code blocks within translated code cache 20. Thus a branch within code block 27 points to a location within code block 28. Likewise, after executing code in code block 28, flow control of the program will continue to code block 29. As is seen in FIG. 8, after executing code in code block 27, flow control of the program will continue to a code block outside translated code cache 20. Likewise, after executing code in code block 29 a dynamic branch branches to an address within a code block outside translated code cache 20.

Once execution of instructions within a code block within translated code cache 20 has begun, execution of instructions within the code block and other code blocks within translated code cache will continue until an instruction is to be executed which is not within a block of code within translated code cache 20. Upon such a cache miss, program control will return to step 22 where a next application address to be executed is looked up. The appropriate block of code will be translated (if not translated already) and placed in translated code cache 20. Then execution of the application will continue.

As discussed above, a debugger may modify blocks of code within translated code cache 20, for example, by adding break instructions. In addition, if debugger 99 wants to modify code not yet translated, the code is translated and the translated code is modified by debugger 99.

Figure 9:
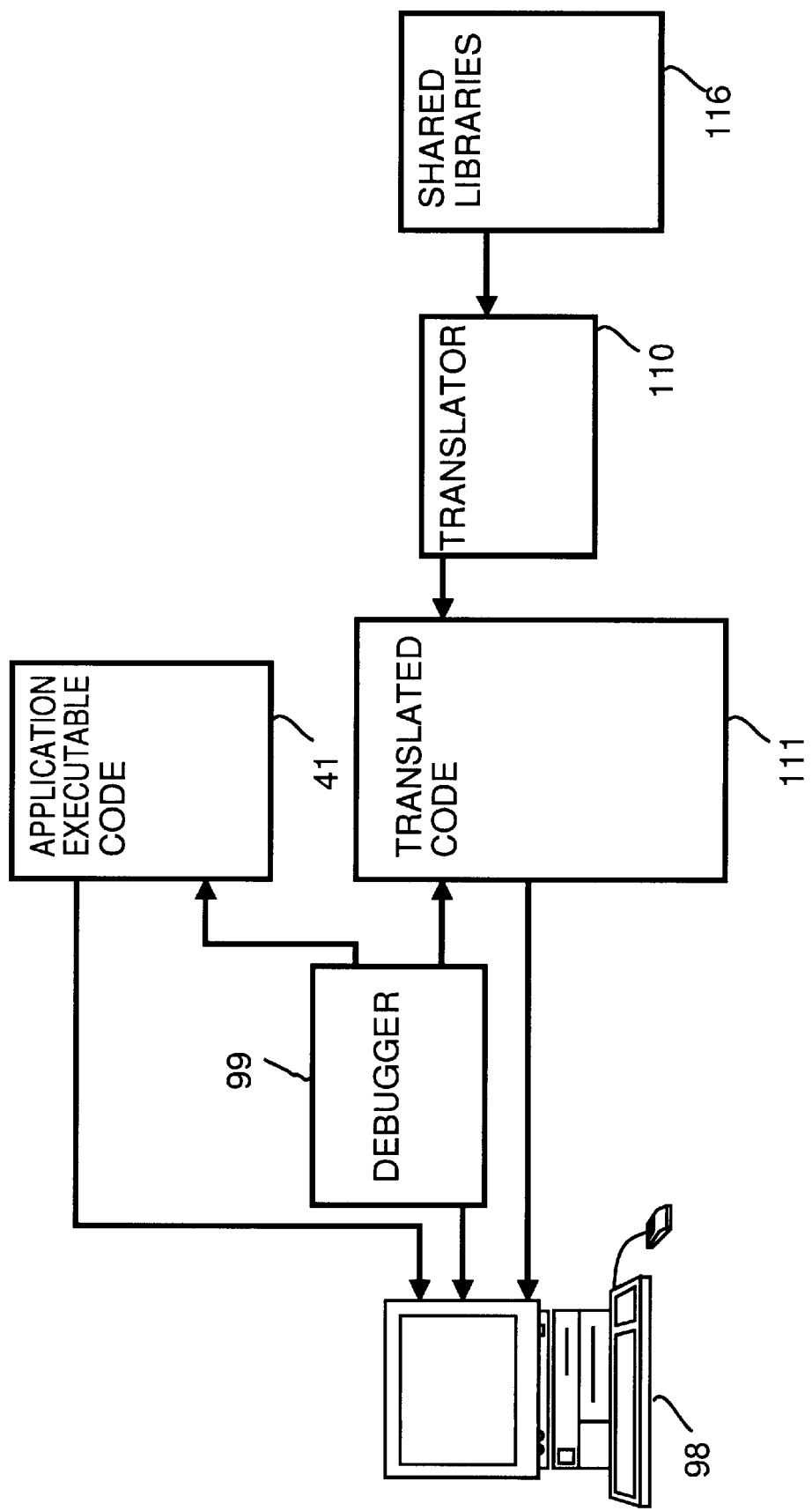
FIG. 9 shows a block diagram of a computing system in which blocks of code within a shared library are dynamically translated in accordance with an alternate preferred embodiment of the present invention.

FIG. 9 illustrates use of an alternate embodiment of the present invention where dynamic translation is used only for shared code. In the alternate embodiment application executable code 41 is directly executed without dynamic translation. Dynamic translator 110 is used to produce translated code during runtime, but only for blocks of code within shared libraries 116 used by application executable code 41. Blocks of code from shared libraries 116 are translated at execution time. The translated blocks of code are then stored in memory as translated code 111. Translated code 111 is stored in memory so that each block of code which is executed a number of times need be translated only once during runtime. This approach allows the flexibility of not requiring that shared code be translated before runtime, but reduces the overhead that would result if a blocks of code from a shared library were translated every time it was executed.

Translated code 111 includes only blocks of code within shared libraries which are utilized by application 41. The blocks of code within shared libraries 116 are translated and added to translated code 111 only as they are actually utilized in runtime or when they are accessed by debugger 99. Debugger 99 inserts break points within translated code 111 and within executable code 41. This is illustrated by FIG. 10.

Figure 10:
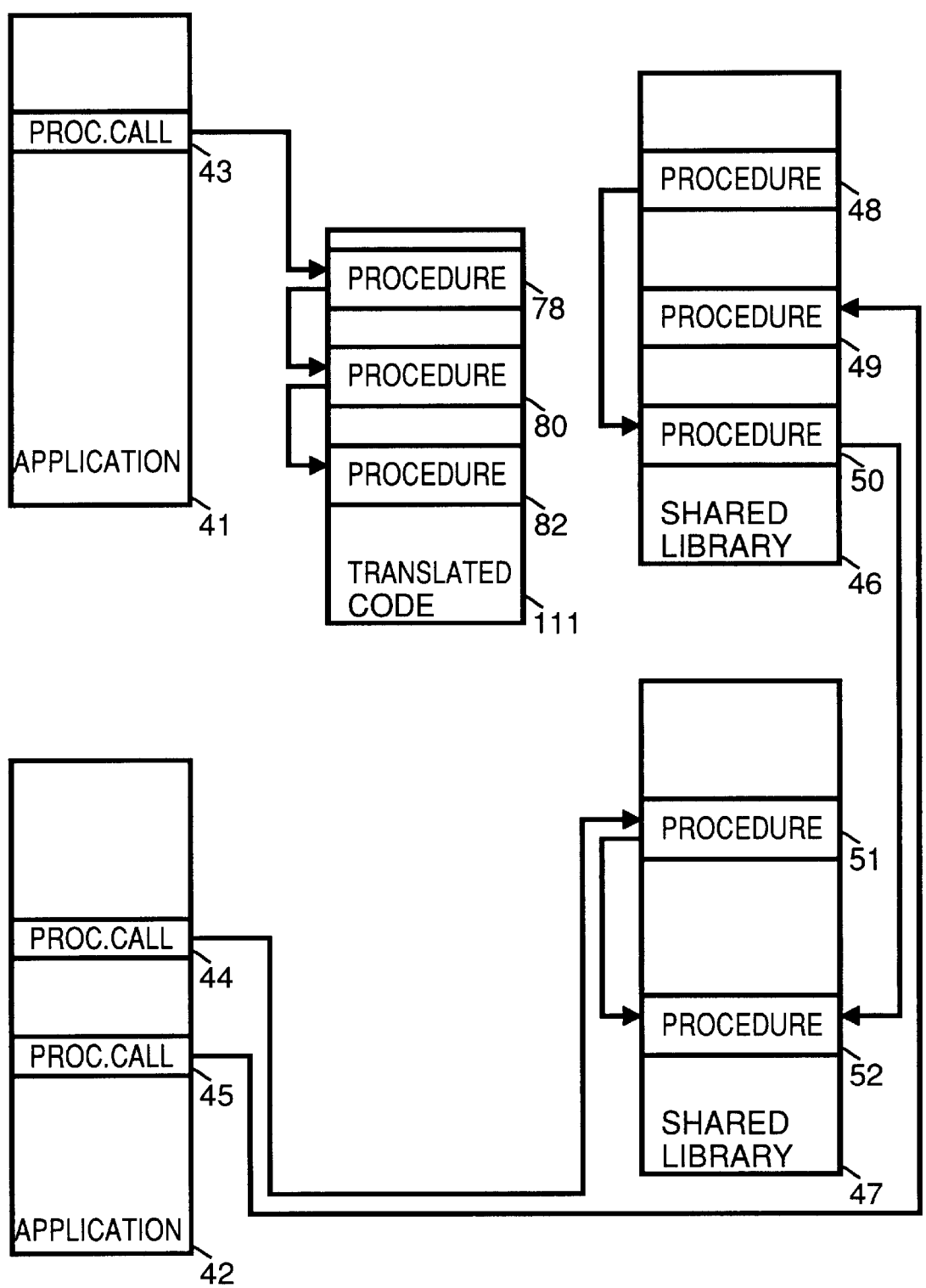
FIG. 10 illustrates use of dynamic translation of blocks of code within shared libraries in accordance with the alternate preferred embodiment of the present invention.

In FIG. 10, translated code 111 includes portions of shared libraries 116 which are translated during runtime of application 41 as they are needed. Thus, procedure call 43 points to a location within translated code 111. Procedure 48 is translated to procedure 78, procedure 50 is translated to procedure 80, procedure 52 is translated to procedure 82. As shown, procedure 78, procedure 80, and procedure 82 are all within translated code 111. Also within translated code 111, debugger 99 places break point as desired. In order to place break points in locations of the application not yet executed, the break instruction is placed directly within executable code for application 41. In order to place a break instruction within a procedure within a shared library, a block of code for the procedure within the shared library is first translated and added to translated code 111. Once translated, debugger 99 places the break points in the desired location within the translated code. As discussed above, while FIG. 10 shows the entirety of procedures 78, 80 and 82 are translated, this may not necessarily be so in various embodiments of the invention. For example, when dynamic translator uses a unit of translation which is a basic block of code, only basic blocks of a procedure which are actually needed are translated. The remainder of a procedure, if unused, will not be translated.

The following tables provide sample code which further illustrate operation of the present invention. Table 1 below shows source code for an example procedure in a shared library.

TABLE 1

| Source Line# | |
|---|---|
| 18 | function bigger_than (int a, int b){ |
| 19 | if (a > b) |
| 20 | return TRUE; |
| 21 | else |
| 22 | return FALSE; |
| 23 | } |

Table 2 below shows the object code for the example procedure in the shared library, using PA-RISC instructions.

TABLE 2

| Code Address | | | |
|---|---|---|---|
| 0x100 COMCLR, <= %gr26, %gr25, %ret0 FALSE | | | ; Set return (%ret0) to |
| | | | ; and nullify next instruction ; if a is NOT > b |
| 0x104 LDI | 1, %ret0 | | ; Set return (%ret1) to TRUE |
| 0x108 BV ,n | 0 (rp) | | ; return from procedure |

Table 3 below shows a sample entry in address to block information map 25 for the example procedure.

TABLE 3

| Address: | 0x100 |
|---|---|
| Blk Info Ptr | [pointer to Block Info Table entry X] |

Table 4 below shows a sample entry X in block information table 26 for the example procedure.

TABLE 4

| Block Info: | Normal_Procedure |
|---|---|
| Translated Code: | [pointer to address "Y" in translated code cache] |

Table 5 below shows the object code for the example procedure in the translated code cache 20.

TABLE 5

| Translated Code Address | | | |
|---|---|---|---|
| Y register | LDW | ARG0 (p), %t1 | ;Load value of %arg0 into temp |
| Y+4 register | LDW | ARG0 (p), %t2 | ;Load value of %arg1 into temp |
| Y+8 | COMCLR, <= %t1, %t2, %ret0 | | ; Set return (%ret0) to FALSE ; and nullify next instruction ; if a is NOT > b |

TABLE 5-continued

| Translated Code Address | | | |
|---|---|---|---|
| Y+0×C | LDI | 1,%ret0 | ; Set return (%ret1) to TRUE |
| Y+0×10 | BV ,n | 0 (rp) | ; return from procedure |

Table 6 below shows the object code for the example procedure in the translated code cache 20 after a debugger sets a breakpoint at the original address 0×100, which corresponds in this case to address Y in the translated code cache.

TABLE 6

| Translated Code Address | | | |
|---|---|---|---|
| Y | BREAK | | ;Stop and give control to debugger |
| Y+4 register | LDW | ARGO (p), %t2 | ;Load value of %arg1 into temp |
| Y+8 | COMCLR, <= %t1, %t2, %ret0 | | ; Set return (%ret0) to FALSE ; and nullify next instruction ; if a is NOT > b |
| Y+0×C | LDI | 1,%ret0 | ; Set return (%ret1) to TRUE |
| Y+0×10 | BV ,n | 0 (rp) | ; return from procedure |

Figure 11:
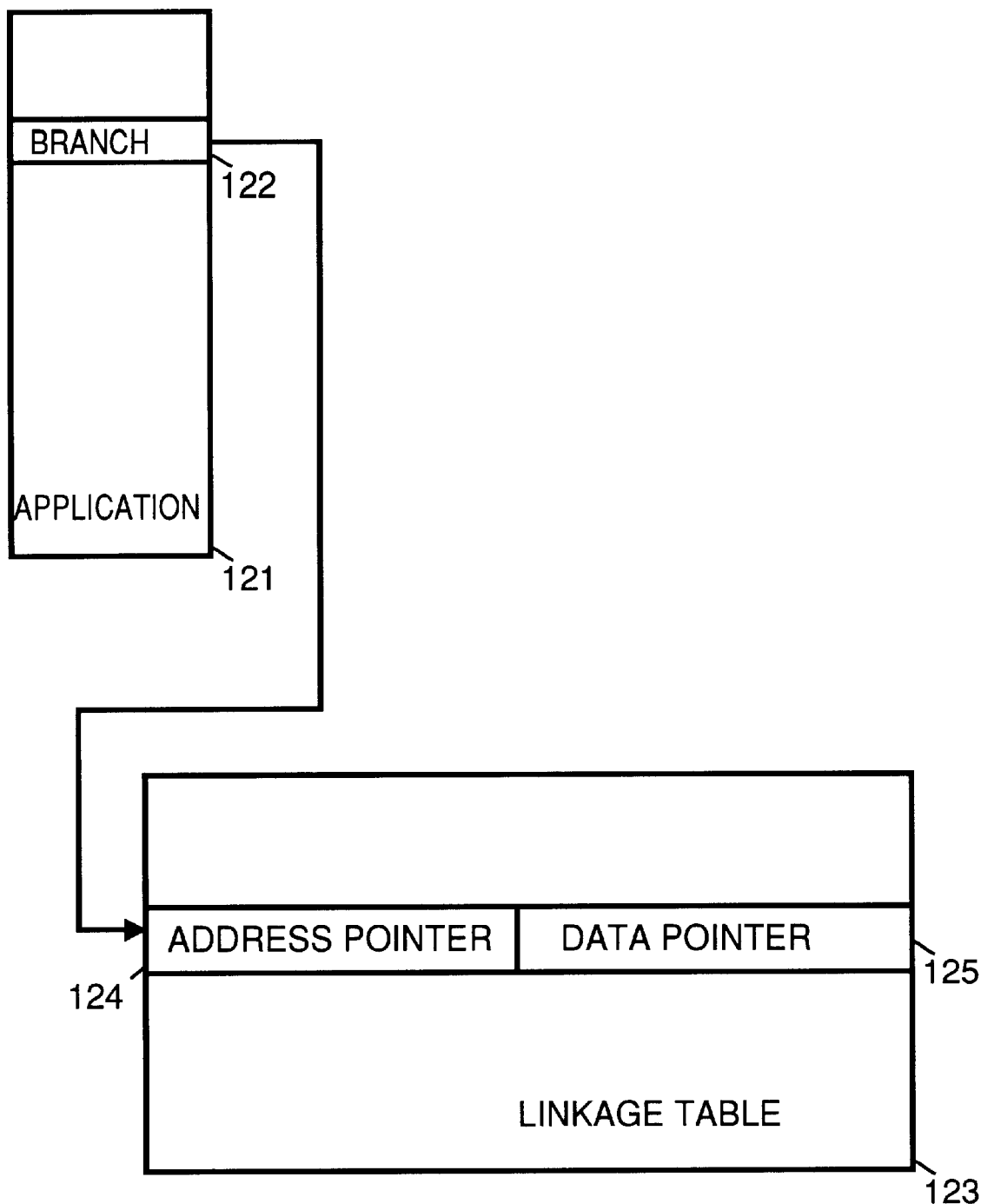
FIG. 11 and FIG. 12 illustrate changes made to a linkage table in order to implement dynamic translation of blocks of code within a shared library in accordance with an alternate preferred embodiment of the present invention.
Figure 12:
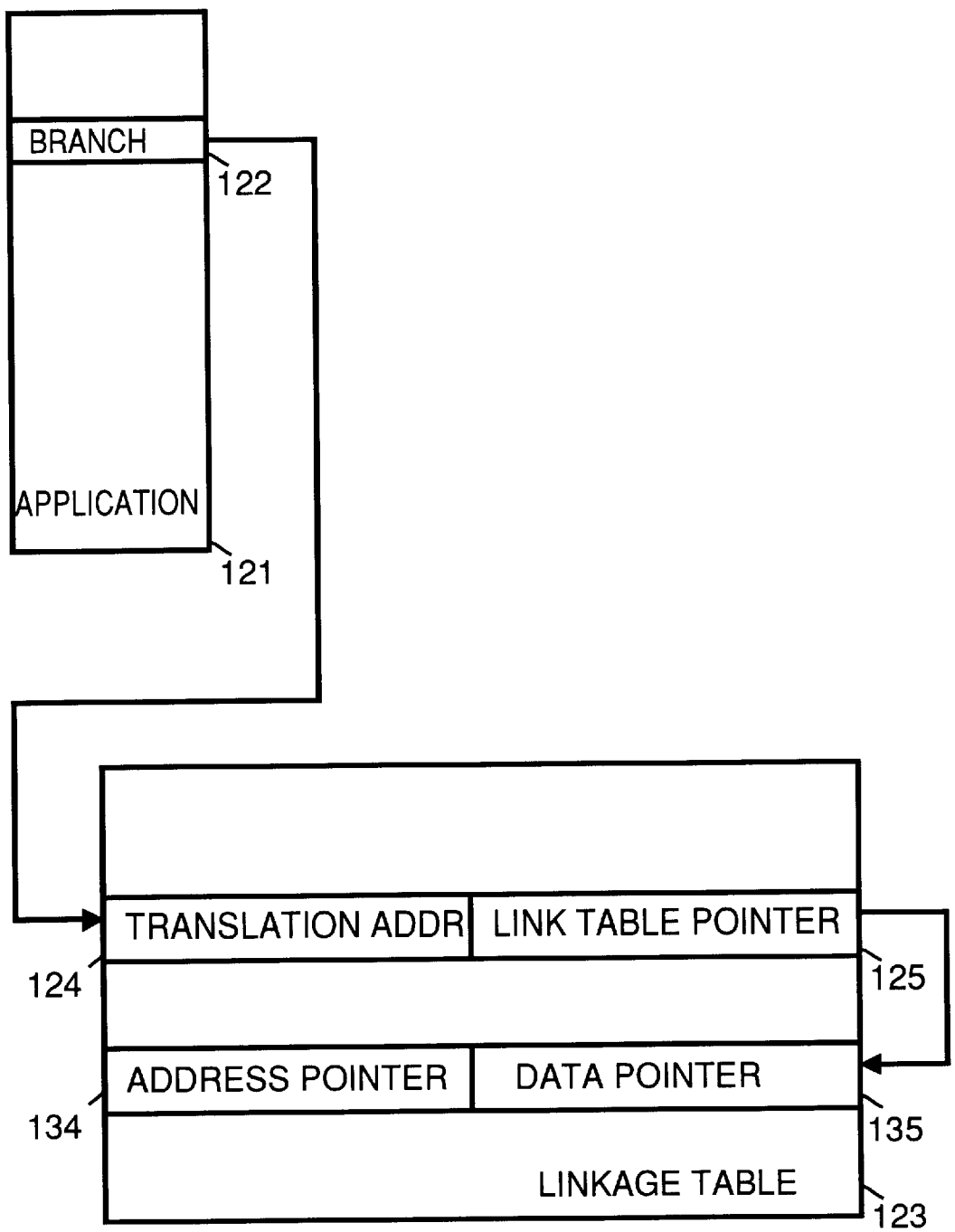

FIG. 11 and FIG. 12 illustrate changes made to a linkage table in order to implement dynamic translation of blocks of code within a shared library in order to implement the alternate preferred embodiment of the present invention illustrated by FIG. 9.

FIG. 11 illustrates a normal implementation of the call mechanism to enter a shared library. At the location in the application object code 121 which calls the shared library, a branch mechanism 122 uses an entry in a linkage table 123. The linkage table entry includes an address pointer 124 to a shared library routine in the shared library and a data pointer 125 which points to data for the shared library routine. The branch mechanism 122 will effect a branch to the shared library routine by loading address pointer 124 and data pointer 125 from the linkage table entry, and then branching to the address specified by address pointer 124. All the entries within linkage table 123 are loaded at load time by the dynamic loader.

FIG. 12 illustrates changes to linkage table 123 made to implement the call mechanism to enter a shared library when the code for shared libraries is dynamically translated. At load time, the dynamic translator creates a new linkage table entry for the values originally in address pointer 124 and pointer 125. The values are moved, respectively, into an address pointer 134 and a data pointer 135. The values previously in address pointer 124 and pointer 125 are replaced, respectively, with an address pointer to the dynamic translator and a linkage table pointer which points to the linkage table entry which includes address pointer 134 and data pointer 135.

When the branch mechanism 122 effects a branch by loading address pointer 124 and pointer 125 from the linkage table entry, and then branching to the address specified by address pointer 124, the result is that the destination of the branch is the dynamic translator. The dynamic translator uses the information in pointer 125 to obtain the values in address pointer 134 and data pointer 135, in order to begin translation.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for performing debugging on a first application which resides in a computing system in which a first block of code within a shared library is utilized by the first application and is available to be utilized by other applications in the system, the method comprising the steps of:

(a) dynamically translating the first block of code during runtime of the first application, the dynamic translation producing a translated block of code; and, (b) placing debugging code within the translated block of code.

2. A method as in claim 1 wherein in step (a), the translated block of code is produced when during, execution of the first application, the first block of code is first called by the first application.

3. A method as in claim 1 wherein in step (a), the translated block of code is produced when, during execution of the first application, a debugger is ready to place the debugging code within the translated block of code.

4. A method as in claim 1 additionally comprising the following step performed concurrently with step (a):

(c) dynamically translating object code of the first application during runtime of the first application to produce translated object code, the translated block of code produced in step (a) being included within the translated object code.

5. A method as in claim 1 wherein the debugging code in step (b) includes a break instruction.

6. A computing system comprising:

a first application process;

a shared library which includes a first block of code utilized by the first application process, the first block of code being available to be utilized by other application processes in the computing system a dynamic translator which during runtime of the first application process translates the first block of code to produce a translated block of code; and, a debugger, the debugger including means for placing debugging code within the translated block of code.

7. A computing system as in claim 6 wherein the dynamic translator produces the translated block of code when, during execution of the first application, the first block of code is first called by the first application.

8. A computing system as in claim 6 wherein the dynamic translator produces the translated block of code when, during execution of the first application, the debugger is ready to place the debugging code within the translated block of code.

9. A computing system as in claim 6 wherein the dynamic translator dynamically translates object code of the first application during runtime of the first application to produce translated object code, the translated block of code being included within the translated object code.

10. A computing system as in claim 6 wherein the debugging code includes a break instruction.

11. A method for performing debugging on a first application which resides in a computing system in which a first block of code within a shared library is utilized by the first application and is available to be utilized by other applications in the system, the method comprising the steps of:

(a) dynamically translating the application during runtime of the first application to produce translated code, the dynamic translation including translating the first block of code to produce a translated block of code, the translated block of code being included within the translated code; and, (b) placing debugging code within the translated code.

12. A method as in claim 11 wherein in step (a), the translated block of code is produced when during, execution of the first application, the first block of code is first called by the first application.

13. A method as in claim 11 wherein in step (a), the translated block of code is produced when, during execution of the first application, a debugger is ready to place the debugging code within the translated block of code.

14. A method as in claim 11 wherein the debugging code in step (b) includes a break instruction.

\* \* \* \* \*